Aug. 18, 1942.   C. W. PRICE   2,293,560
COMBINATION CRADLE AND CARRIAGE
Filed Sept. 3, 1940   2 Sheets-Sheet 2
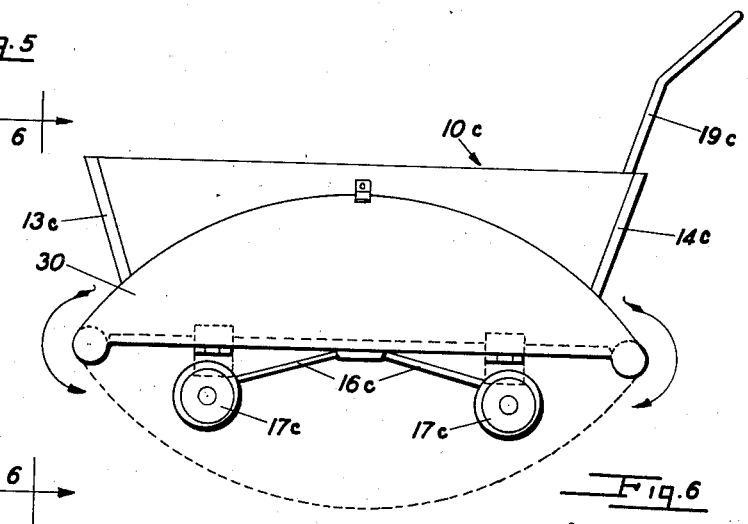
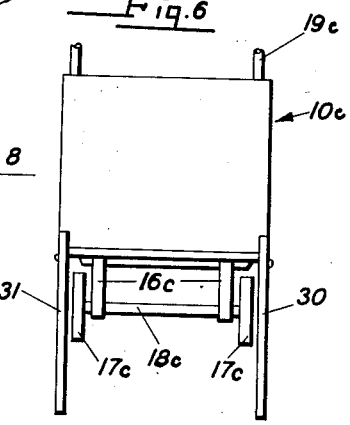
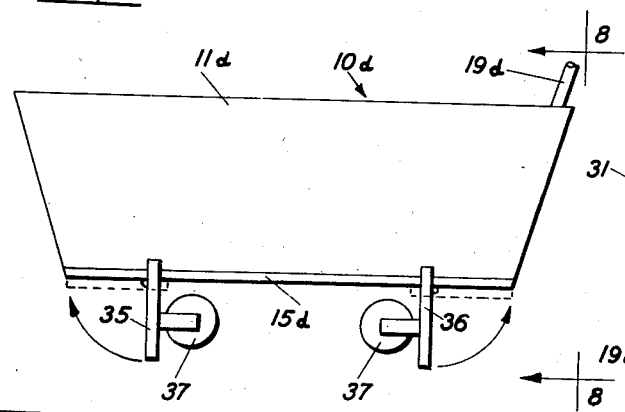
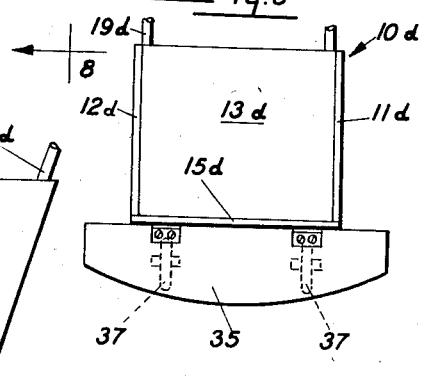
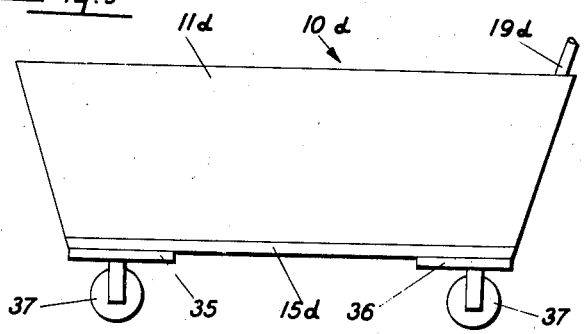
INVENTOR.
CHARLES W. PRICE
BY
ATTORNEY.

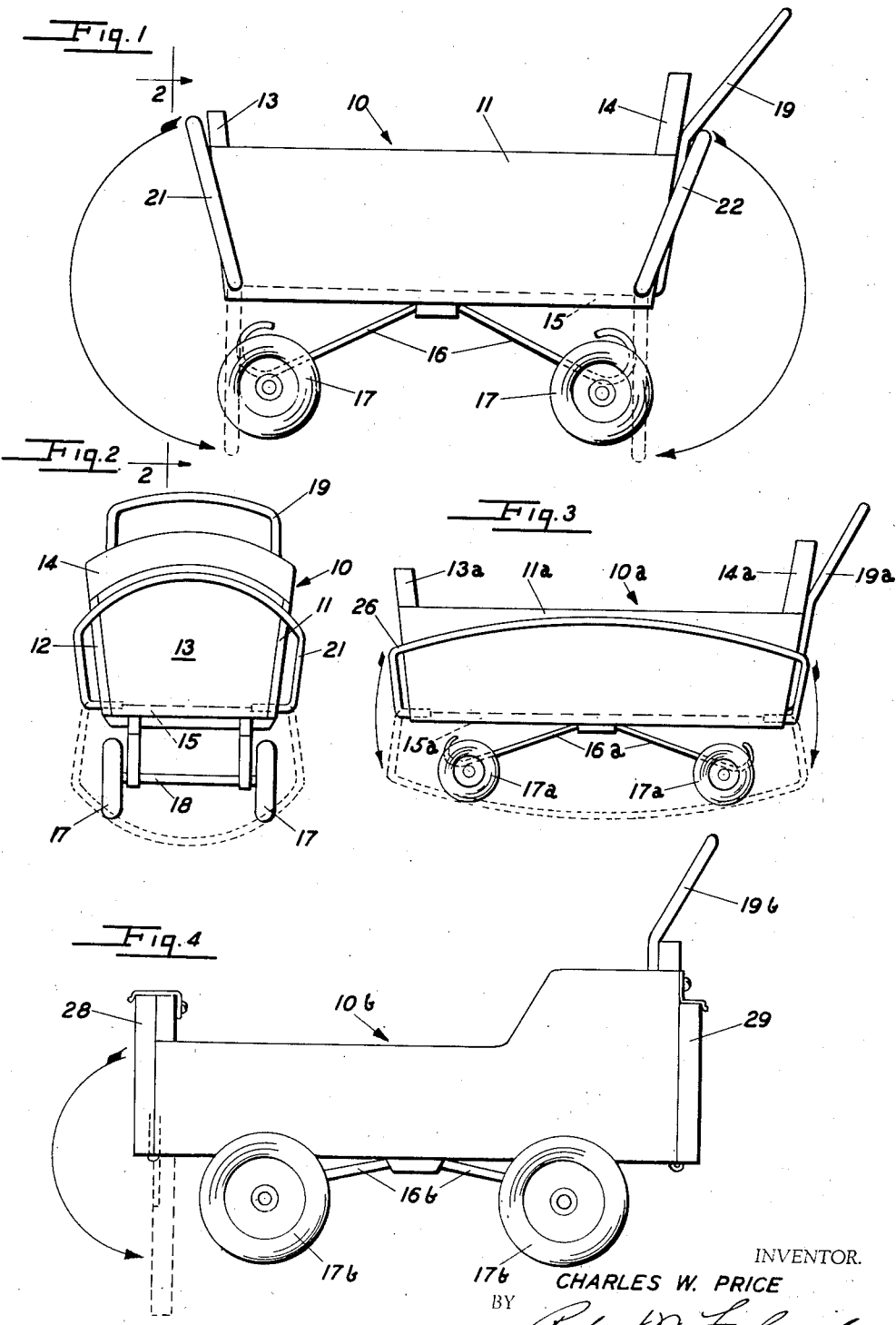

Patented Aug. 18, 1942

2,293,560

UNITED STATES PATENT OFFICE 2,293,560

COMBINATION CRADLE AND CARRIAGE

Charles W. Price, Los Angeles, Calif.

Application September 3, 1940, Serial No. 355,149

5 Claims. (Cl. 280—31)

My invention relates generally to carriages for infants and other small children, and more particularly to such carriages which may be transformed into rocking cradles by a few minor adjustments.

It often happens that families having children are unable to afford both a cradle and a baby carriage, and hence they must dispense with one or the other. This is obviously unsatisfactory, and a single article which performs the functions of both is a boon to such families. In another field, that of children's toys, such an article finds a ready market, since its appeal to children will be apparent.

It is, therefore, a major object of my invention to provide a combination cradle and baby carriage which may be produced and sold at a relatively low price.

It is a further object of my invention to provide such a combination cradle and baby carriage which may be easily converted from an unsprung rockable cradle to a spring-mounted baby carriage.

It is another object of my invention to provide such a device which may be converted from one form to another with a minimum of effort and time.

These and other objects of my invention will become apparent from the following description of preferred and modified forms thereof, and from the drawings illustrating those forms, in which:

Fig. 1 is a side elevational view of a preferred form of my invention,

Fig. 2 is an end elevational view of my preferred form,

Fig. 3 is a side elevational view of a modified form,

Fig. 4 is a side elevational view of an optional form of my combined cradle and baby carriage, Fig. 5 is a side elevational view of a modification of my optional form, Fig. 6 is an end elevational view of the form shown in Fig. 5, Fig. 7 is a side elevational view of an alternative form of construction showing the rocker members lowered to operative position, Fig. 8 is an end elevational view of the form shown in Fig. 7, and Fig. 9 is a side elevational view of the form shown in Fig. 7, but with the rocker members raised to inoperative position.

Referring now to the drawings, and particularly to Figs. 1 and 2 thereof, the numeral 10 indicates generally a body having sides 11 and 12, ends 13 and 14, and a bottom 15. Attached to the bottom 15 by a suitable springing arrangement 16 are wheels 17 which support the body 10 and permit it to be moved about freely. The spring means 16 will normally be relatively "soft," and hence the wheels should preferably be attached to axles 18 rather than individually sprung, for in this way greater strength is achieved, while at the same time the desirable features of soft springing are retained. To aid in moving the baby carriage, I prefer to provide a handle 19 extending upwardly and rearwardly from one end of the body 10, as is customary with such vehicles.

At either end of the body 10, near the bottom thereof, I provide rockers 21 and 22 which are rotatable about an axis parallel to the axle 18, the rockers being of a size sufficient to support the weight of the entire cradle and the child placed therein. In my preferred form, the rockers 21 and 22 are tubular or rod-like, and may be formed in the shape of a curve as best seen in Fig. 2, but it will be apparent that other types of curve may be used, so long as the portion of the rocker which is designed to bear against the floor provides a solid but rockable structure. It is of course advisable to form the rockers so that stops are provided to prevent the rocker from moving too far and allowing the cradle to upset.

Since the rockers 21 and 22 are rotatably mounted, they may easily be lowered to the position shown in dotted outline in Fig. 1 where they may be locked in position by any suitable means, thus raising the wheels from the floor and rockably supporting the cradle. In this position, the spring members 16 carry none of the load of the cradle and hence the latter is firmly supported, and there is no danger of tipping the cradle without moving the rockers. When the rockers 21 and 22 are in their inoperative or raised position, as shown in full outline in Fig. 1, a catch of any suitable type may advantageously be used to hold them in that position. By releasing the catch and swinging the rockers 21 and 22 downwardly as indicated by the arrows, what was previously used as a baby carriage is converted into a cradle; and the convenience and utility of such a device will be readily apparent.

While the device just described will permit the cradle to be rocked about a longitudinal axis, it may be desirable or preferable to rock the cradle about a transverse axis, and in the form shown in Fig. 3, I have provided a device wherein this is possible. The device shown therein is very similar to my preferred form, having a body 10a with sides 11a and 12a, ends 13a and 14a, bottom 15a, and spring members 16a to which wheels 17a are attached. A handle 19a is provided as in my preferred form; but instead of being provided with rockers which extend transversely of the body 10a, the rockers 25 and 26 in my modified form are rotatably attached so that they extend lengthwise of the body. Suitable holding and locking means should of course be provided as in my preferred form, and by lowering the rockers 26, as indicated by the arrows, the wheels 17a will be lifted from the floor and the cradle will be rockably supported by the rockers.

In Fig. 4, I have illustrated an optional form of my invention which is similar to my preferred form, but which instead of using tubular or rod-like rockers, makes use of solid rockers 28 and 29 which may be hingedly attached to the bottom of the body 10b near its end so that the rockers may be raised to inoperative position, shown in full outline in Fig. 4 or may be lowered as indicated by the arrow to the operative position, shown in dotted outline. Any suitable form of catch 39 may be applied to hold the rockers in the raised position, and like all other forms of my invention, suitable means should be provided to lock the rockers in lowered position.

The form shown in Figs. 5 and 6 is a modification of the optional form shown in Fig. 4, but this form is designed to be rocked about a transverse axis, as is the form shown in Fig. 3, instead of about a longitudinal axis, as are the forms shown in Figs. 1 and 4. The body 10c, the spring members 16c, and the wheels 17c are similar to those of the previously-described forms, as is the handle 19c, but solid rockers 30 and 31 are hingedly attached along the sides of the bottom of the body 10c, so that the rockers may be lowered from inoperative position shown in full outline in Fig. 5, to the operative position shown in dotted outline in Fig. 5, and also shown in full outline in Fig. 6.

Thus it will be seen that in the forms described, I have shown various methods of providing a spring-mounted baby carriage with rockers which may be used to convert it into a rockable cradle which is solidly and not resiliently supported by the rockers. While such a combination cradle and baby carriage is very economically built, where the utmost economy is required, I have provided the form shown in Figs. 7, 8, and 9. In this form, a body 10d, having sides 11d and 12d, ends 13d and 14d, bottom 15d, and handle 19d, is provided with rockers 35 and 36 extending transversely across the bottom 15d and hingedly attached thereto. The rockers 35 and 36 are mounted so that they may be extended downwardly, perpendicular to the bottom 15d, or swung upwardly, as shown by the arrows in Fig. 7, so that they are parallel to and bear against the bottom, as shown in dotted outline in Fig. 7.

To the inner or downward faces of the rockers 35 and 36, I attach wheels 37 which may be individually mounted or which, if desired, may be provided with axles supporting each pair of wheels. By providing individual mounting for each wheel, a caster-type mounting may be used if desired, but this will increase the cost and hence will normally not be used. Similarly, the wheels may be spring mounted, but since this would likewise increase the cost, it will normally not be done when building this form of my invention. Locking means of any suitable type are provided to retain the rockers 35 and 36 in their downwardly-projecting position, and in their upward or raised position. By releasing the locking means and raising the rockers to the position shown in Fig. 9, a baby carriage is provided which may be wheeled about from place to place. Since the carriage is not spring mounted, the occupant of this carriage will experience more bouncing and jarring than he will in one of my previously-described forms, but by the choice and use of suitable padding in the bottom of the body 10d, much of the discomfort otherwise attendant upon the use of this form may be eliminated.

It will be apparent that if it is desired to have the cradle rock about a transverse axis instead of a longitudinal axis, it will be a simple matter to provide rockers extending longitudinally of the bottom 15d and carrying wheels mounted in a manner similar to that shown in Figs. 7, 8, and 9. Such a modification will become apparent from an inspection of the modified forms of my preferred and optional type of cradle and baby carriage, and will be obvious to those skilled in the art.

While I have described my invention as if it were designed exclusively for human beings, it will be seen that it makes an ideal toy, since the one article will provide both a cradle for the doll and a carriage for it. While I have shown and described preferred and optional forms of my invention, I do not wish to be limited to the particular form or arrangement of parts herein described and shown except as limited by my appended claims.

I claim as my invention:

1. A device of the character described which includes: a body; a rocker rotatably attached to the bottom of said body; and wheels attached to said rocker whereby either said wheels or said rocker may support said body.

2. A device of the character described which includes: a body; a rocker rotatably attached to the bottom of said body and adapted to be extended downwardly from said bottom or placed in a substantially horizontal position; and wheels attached to said rocker so that said wheels may support said body when said rocker is in substantially horizontal position, or said rocker may support said body when said rocker is in substantially vertical position.

3. A device as described in claim 2 which has a first rocker attached near the forward edge of said bottom and a second rocker attached near the rear edge of said bottom.

4. A device of the character described which includes: a body; a rocker rotatably attached to the bottom of said body; and wheels attached to said rocker and movable therewith whereby said wheels may support said body when said rocker is in one position, and said rocker may support said body when said rocker is in another position.

5. A device of the character described which includes: a body; a rocker rotatably attached to the bottom of said body and adapted to be extended downwardly from said bottom or placed in a substantially horizontal position; means for retaining said rocker in either of said positions; and wheels attached to said rocker and movable therewith so that said wheels may support said body when said rocker is in substantially horizontal position, or said rocker may support said body when said rocker is in substantially vertical position.

CHARLES W. PRICE.